United States Patent [19]

Tilford

[11] 3,919,431
[45] Nov. 11, 1975

[54] PROCESS FOR MAKING AND USING SODIUM BENZOATE-CAFFEINE COMPOSITIONS

[75] Inventor: Baxter L. Tilford, Richmond Heights, Mo.

[73] Assignee: Monsanto Company, St. Louis, Mo.

[22] Filed: Oct. 18, 1973

[21] Appl. No.: 407,708

[52] U.S. Cl. ............ 426/190; 252/400 R; 260/253; 426/181; 426/193; 426/228; 426/365
[51] Int. Cl.$^2$ .......................................... A23L 2/00
[58] Field of Search ............ 260/253, 256; 426/227, 426/228, 190, 193, 326, 365, 366, 93, 148, 427, 175, 181, 153, 217; 252/400 R, 403

[56] References Cited
UNITED STATES PATENTS

| | | | |
|---|---|---|---|
| 2,432,759 | 12/1947 | Heyman | 426/366 |
| 3,241,977 | 3/1966 | Mitchell et al. | 426/191 |
| 3,436,224 | 4/1969 | Bode | 426/191 |
| 3,525,626 | 8/1970 | Swaine et al. | 426/190 |
| 3,767,827 | 10/1973 | Veno et al. | 426/365 X |
| 3,773,961 | 11/1973 | Gordon | 426/190 X |
| 3,809,775 | 5/1974 | Ganiaris | 426/427 |

OTHER PUBLICATIONS

Neidig et al.; "The Esters of Para–Hydroxybenzoic Acid as Preservatives"; The Drug and Cosmetic Industry (1954); pp. 408–410, 481–489; 426–326.

*Primary Examiner*—S. Leon Bashore
*Assistant Examiner*—Kenneth M. Schor
*Attorney, Agent, or Firm*—H. C. Stanley; J. E. Maurer; N. E. Willis

[57] ABSTRACT

Novel sodium benzoate-caffeine compositions are prepared by dissolving the sodium beroate and caffeine to form a solution and then drying. This permits regulation of the relative proportions of the benzoate and caffeine. The prepared compositions are used in beverages containing sodium benzoate and caffeine.

7 Claims, No Drawings

PROCESS FOR MAKING AND USING SODIUM BENZOATE-CAFFEINE COMPOSITIONS

BACKGROUND OF THE INVENTION

1. Field of the Invention

This invention relates to compositions which are useful in preparing beverages and methods of preparing such compositions and beverages. More particularly, this invention provides a novel means of incorporating sodium benzoate and caffeine into beverages containing these ingredients.

2. Description of the Prior Art

Many well-known beverages contain sodium benzoate and caffeine as important ingredients that provide the beverage with desired properties. Illustrative of such beverages are the well-known "cola" beverages. The preparer of these beverages must take particular pains to insure that the correct quantities and proportions of these ingredients, sodium benzoate and caffeine, are incorporated therein. Heretofore such preparers have been required to maintain rather stringent specifications as to particle-sizes and densities of these two materials as they are incorporated as a physical mixture. Such measures were to insure that the particles of sodium benzoate and caffeine would remain as an intimate mixture throughout the preparative steps. To deviate from such stringent specifications often led to segregation of particles and/or improper amounts and proportions of these two ingredients being incorporated into beverage compositions when the mixture was fed through the mixing apparatus. Such stringent specifications are, of course, both difficult and costly to meet.

It is an object of this invention to substantially eliminate the need for such stringent specifications while still providing the amounts and proportions of the ingredients desired.

SUMMARY OF THE INVENTION

This invention provides novel beverage compositions that are solid, homogeneous compositions comprising sodium benzoate and caffeine that are not physical mixtures. These compositions can be prepared by forming an aqueous solution of sodium benzoate and caffeine and drying the solution. The resulting solid composition has been found to be particularly useful in the above-described beverage preparation procedures and substantially eliminates the stringent specifications heretofore required for particle-size and densities of the two materials; sodium benzoate and caffeine.

DESCRIPTION OF THE PREFERRED EMBODIMENTS

The novel compositions of the present invention can be expeditiously prepared by forming an aqueous solution containing sodium benzoate and caffeine in the desired ratio and evaporating the water to form a solid composition.

The sodium benzoate should be of a grade that is physiologically acceptable. Since it is to be dissolved in an aqueous solution for preparation of the compositions of this invention its particle size is a consideration only as to the ease of handling and dissolution rate desired in forming the aqueous solution.

The caffeine should likewise be of a grade that is physiologically acceptable. The ease of dissolution of the caffeine is enhanced significantly if the sodium benzoate has been dissolved before attempting to dissolve the caffeine. Alternatively the two ingredients can be dissolved simultaneously or in any manner found most practical to form the desired aqueous solution containing the desired ratio of ingredients.

The aqueous solution can be formed at any suitable temperature that the ingredients sodium benzoate and caffeine will readily dissolve. For a desired ratio of 2.5 parts sodium benzoate to 1 part caffeine by weight, the aqueous solution, at 25°C., could contain up to about 31% by weight of sodium benzoate and up to about 12.4 % by weight of caffeine. Obviously some other solvents, such as alcohols, glycerol, etc., may be utilized if desired.

Upon drying, a solid composition is formed which has sodium benzoate and caffeine homogeneously present in the same ratio as in the aqueous solution utilized and may have up to about 1.0% by weight of residual water based on the weight of the solid composition, preferably up to about 0.2%.

The sodium benzoate to caffeine ratio, by weight, in such solid compositions can be from about 0.1 to 1 to about 3 to 1. Such solid compositions can comprise from about 14% to about 79% by weight sodium benzoate, from about 20% to about 85% by weight of caffeine and up to about 1% by weight water.

Drying of the aqueous solution to form the solid, homogeneous composition can be carried out by any of the well-known drying methods. Illustrative of these methods are: spray drying, drum drying, vacuum drying, tray drying, oven drying, etc. Particularly preferred is drum drying.

A particular advantage of the solid compositions of the present invention is the preciseness with which they can be formed so as to provide compositions that can be substantially easily duplicated in subsequent manufacturing operations. This is particularly advantageous in view of the heretofore realized difficulties in achieving such preciseness by controlling particle size and density to achieve the desired quantities and proportions of the two ingredients in beverages.

The sodium-benzoate compositions of this invention can be utilized in the same solid handling apparatus heretofore utilized with physical mixtures in preparing beverages. For instance, such compositions are conveyed to a large vat containing an aqueous base syrup and are added thereto with sufficient agitation to dissolve the compositions. Due to the homogeneous nature of the compositions there is no need to control the apparatus in any regard other than the amount of sodium-benzoate composition incorporated. The amounts of each ingredient and their ratios is controlled without having to control particle size or density as heretofore found necessary.

The following examples are given to illustrate the present invention in detail. It is to be understood that the specific details given in these examples are not to be construed as limiting the scope of the invention.

EXAMPLE 1

An aqueous solution was formed containing 350 grams of sodium benzoate (29.4% by weight), 140 grams of caffeine (11.8% by weight) and 700 ml. of water. This solution contained sodium benzoate/caffeine at a ratio of about 2.5/1. The solution occupied 1,040 ml. and had a specific gravity of 1.144 at room temperature. Upon drying (water content — 0.16% by weight)

a homogeneous solid composition was formed having the same ratio of sodium benzoate to caffeine. The solid composition was soluble in water giving an essentially clear solution upon dissolving 4.9 grams in 7.0 ml. of water.

EXAMPLE 2

An aqueous solution similar to that prepared in Example 1 was prepared containing 20 grams of caffeine, 50 grams of sodium benzoate and 100 ml. of water. The solution was essentially clear at 25°C. The solid composition resulting from drying this solution, analyzed by weight, was as follows:

|  | % |
|---|---|
| Caffeine | 28.5 |
| Sodium benzoate | 70.7 |
| Water | 0.16 |

Dissolving 4.9 grams of this solid composition in 7.0 ml. water gave an essentially clear solution.

EXAMPLE 3

The solid compositions of Examples 1 and 2 can be readily dissolved in an aqueous syrup which is useful for forming a beverage.

While the invention has been described herein with regard to certain specific embodiments, it is not so limited. It is to be understood that variations and modifications thereof may be made by those skilled in the art without departing from the spirit and scope of the invention.

The embodiments of this invention in which an exclusive property or privilege is claimed are defined as follows:

1. A process for preparing a solid, homogeneous composition consisting essentially of, on a weight basis, from about 14% to about 79% sodium benzoate, from about 20% to about 85% caffeine and up to about 1.0% water comprising forming a solution of the sodium benzoate and the caffeine and then drying the solution.

2. A process of claim 1 wherein the drying is drum drying.

3. The composition which is the product of the process of claim 1.

4. The composition which is a product of the process of claim 1 that has up to 0.2%, by weight, water.

5. In a process for preparing beverages that contain sodium benzoate and caffeine; the improvement wherein the sodium benzoate and caffeine are introduced into the beverage forming process as the composition which is the product of the process of claim 1.

6. The process of claim 5 wherein the sodium benzoate-caffeine composition is dried by drum drying.

7. The process of claim 5 wherein the sodium benzoate-caffeine composition has up to 0.2%, by weight, water.

* * * * *